(12) United States Patent
Rose

(10) Patent No.: US 6,232,914 B1
(45) Date of Patent: May 15, 2001

(54) METHOD OF AND APPARATUS FOR DETERMINING THE RELATIVE WEIGHT AND WEAPON CLASS OF BATTLEFIELD PROJECTILES INSENSITIVE TO ERRORS IN METEOROLOGICAL DATA AND RADAR MEASUREMENTS

(75) Inventor: Conrad Rose, King George, VA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/433,076

(22) Filed: Nov. 3, 1999

(51) Int. Cl.$^7$ .............................. G01S 13/00; G01S 13/88
(52) U.S. Cl. .............................................. 342/192
(58) Field of Search ................................ 342/192; 73/167

(56) References Cited

U.S. PATENT DOCUMENTS 5,349,853 * 9/1994 Oehler ..................................... 73/167

* cited by examiner

*Primary Examiner*—Ian J. Lobo
(74) *Attorney, Agent, or Firm*—Lowe Hauptman Gilman & Berner, LLP

(57) ABSTRACT

The application measures a projectile velocity and an acceleration from radar track data. The air temperature and an air pressure are measured. The measured air temperature and the measured air pressure are extrapolated to the projectile's location for each instant in time a radar measurement made by the radar. The projectile's drag parameter is estimated at each time in the projectile's flight that the projectile's velocity and acceleration are estimated. The projectile's Mach number is estimated at each time in the projectile's flight. The drag coefficient is estimated. A functionally normalized drag parameter (FNDP) is formed. The FNDP is defined as the ratio of drag parameter of a reference projectile at each Mach number the drag is measured to the in-flight projectile's drag parameter at the corresponding Mach numbers. A weighted average of the resulting FNDP values is performed with respect to Mach number. The most likely of three regions the FNDP parameter lies is statistically determined. The relative weight of the in-flight projectile is inferred as one of light, medium or heavy based on the most likely of the three regions.

25 Claims, 10 Drawing Sheets

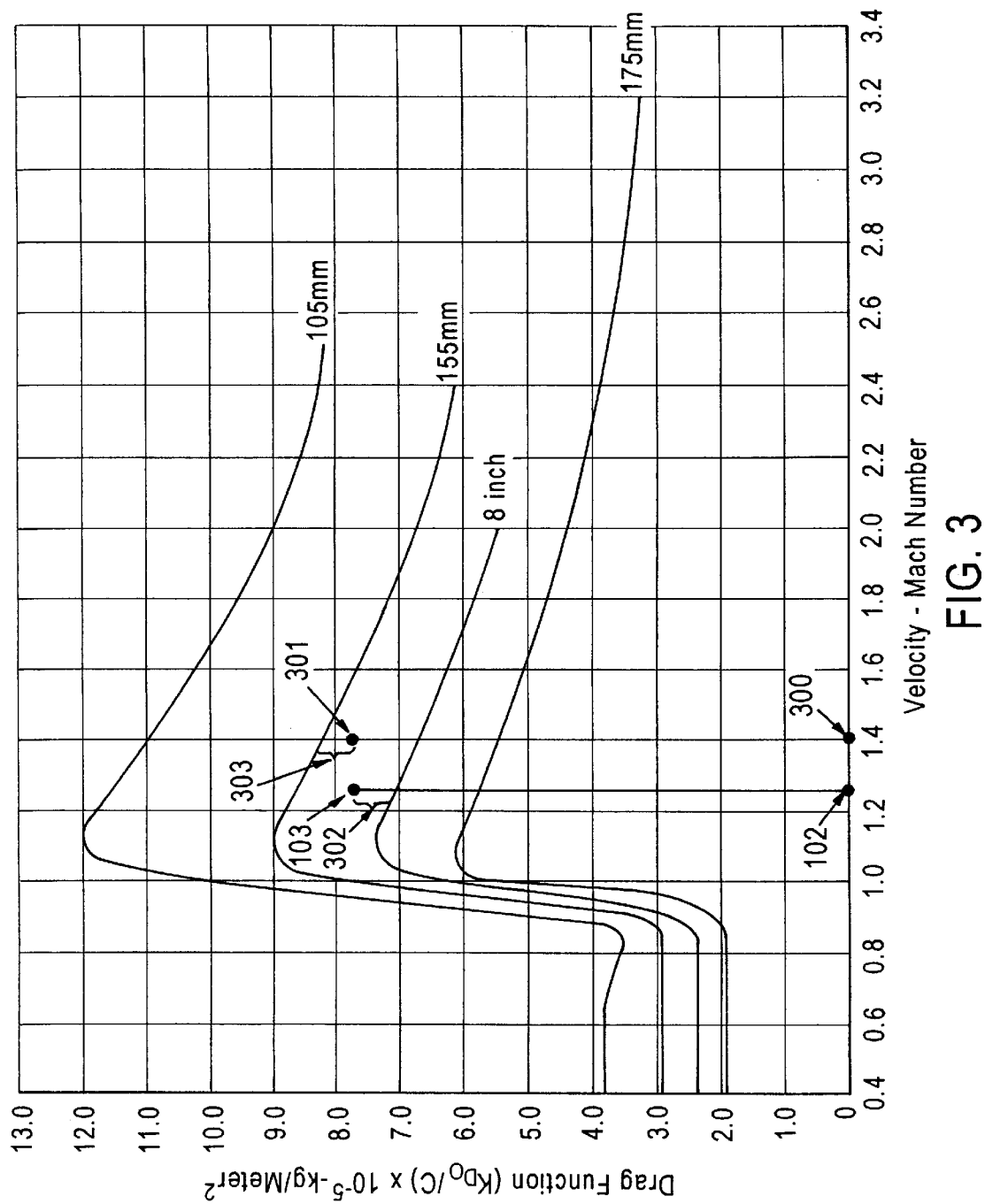

METHOD OF AND APPARATUS FOR DETERMINING THE RELATIVE WEIGHT AND WEAPON CLASS OF BATTLEFIELD PROJECTILES INSENSITIVE TO ERRORS IN METEOROLOGICAL DATA AND RADAR MEASUREMENTS

FIELD OF THE INVENTION

The present invention relates generally to radar systems, and more particularly, to the use of radar data to determine weight information of projectiles. More particularly, the present invention provides a method of determining the relative weight and weapon class of battlefield projectiles that is insensitive to errors in meteorological data and radar measurements.

BACKGROUND OF THE INVENTION

An important aspect of battlefield intelligence is the real time assessment of the strength and disposition of the opposing force's mortar, artillery, missiles and rockets. To direct counterfire it is desirable to type the weight of these projectiles as light, medium or heavy. The weight of a projectile can be extracted from radar data utilizing the description of the projectile's acceleration $\vec{a}$ embodied in Equation (1), $$\vec{a} = -K_D \rho |\vec{v} - \vec{w}|(\vec{v} - \vec{w}) + \vec{g} - 2\vec{\omega} \times \vec{v}, \quad (1)$$

and in particular the properties of the drag parameter $K_D$. The other quantities and terms in equation (1) are air density $\rho$, projectile velocity $\vec{v}$, wind velocity $\vec{w}$, gravitational acceleration $\vec{g}$, and Coriolis acceleration $2\vec{\omega} \times \vec{v}$.

Equation (1), which represents the vector particle momentum or point mass (PM) approximation to the six degree-of-freedom model of the projectile's motion, accurately describes the flight of projectiles at lower quadrant elevations, with the caveat that rockets and missiles are in the rockets or missiles unpowered phase. Equation (1) is incorporated into radar tracking filters as the signal or plant model to obtain filtered position, velocity and acceleration estimates from raw measurement data. Equation (1) is also used in estimators extracting projectile time-of-flight (TOF), initial firing point and impact point from the tracking filter outputs. In carrying out these extraction and smoothing operations, the drag parameter represents another unknown that must be estimated from noise corrupted radar measurements. Because the drag parameter must be found to accomplish these radar track functions, it is natural to attempt to use the drag parameter to satisfy ancillary analysis requirements, such as projectile light, medium and heavy classification (LMH Class). This is done by associating the estimated drag parameter with one of a stored set of zero-yaw drag parameters with the set representative of all projectiles the radar will encounter.

FIG. 1 through FIG. 3 illustrate this approach of estimating the drag parameter. FIG. 1 illustrates a family of zero-yaw drag curves 100 characterizing 105 mm (curve 101), 155 mm (curve 106), 175 mm (curve 108), and 8 in (curve 104) artillery shells with the x-axis representing velocity, Mach number and the y-axis representing drag functions $(K_{DO}) \times 10^5$ (-kg/meter$^2$). In this example the 155 mm (curve 106) is considered medium weight: hence projectiles characterized by drag parameters lying above curve 106 are classed as light (e.g., curve 101), and those below (e.g., curve 108) are considered heavy. The family of curves 100 are represented as functions of the projectile Mach number (x-axis), and would typically be stored in lookup tables. To perform LMH-Class, the radar-tracking filter produces a velocity, from which, for example, Mach number 102 is derived which lies between Mach number 1.2 and 1.4. Associated with this Mach number 102 is the drag parameter estimate 103 from the tracking filter which lies below a drag function of 8.0. This drag parameter estimate 103 is closest to curve 104, and hence is associated with the 8 in projectile, so the projectile producing the track data is "heavy".

The drag parameter estimate is typically derived by the radar tracking filter using the concepts embodied in Pearce "A Universal Drag Curve for an Artillery Locating Radar," U.S. Army Electronics Command, Fort Monmouth, N. J. Technical Report ECOM 4088. Pearce showed that if each curve in FIG. 1 is normalized by its value at Mach 1.1, the family of curves 100 collapses as illustrated in FIG. 2 to the family of curves 200. Again in FIG. 2, the x-axis represents velocity—Mach number and the y-axis represents drag function $(K_{DO}) \times 10^5$ (-kg/meter$^2$). This new set of curves is essentially represented by a single curve 201. Pearce's normalization indicates that the shape of the drag curve for geometrically similar projectiles is known a priori and hence can be functionalized and incorporated into the tracking model based on Equation 1. Estimating the drag parameter in the tracking filter is then reduced to estimating a single constant which translates the single universal curve 201 representative of 200 to the appropriate curve in the set 100. Because estimating this scaling parameter from noise corrupted radar data is a highly nonlinear process, there is always a not negligible error associated with the result. This error was indicated in FIG. 1 by the estimate 103 not lying on the curve 104. But there is also a further error in the LMH-Class process that has not been addressed yet, and that is the error involved in going from the estimated velocity to the corresponding Mach number. This transformation involves meteorological measurements, and in particular measurements of wind speed and direction, air temperature and atmospheric pressure which may be hours old, or not available to the radar tracker at all.

The effect of errors in both drag parameter estimation and in Mach number is illustrated in FIG. 3. Because of meteorological and radar measurement errors, the Mach number associated with the drag parameter estimate 103 is not 102, but point 300 depicted in FIG. 3 at approximately Mach number 1.4. This translates the drag parameter estimate to the right from point 103 to point 301, which causes it to be incorrectly associated with the 155 mm curve (since difference 303 is smaller than difference 302), and hence falsely identified (IDed) or classified as belonging to a medium weight projectile. Difference 303 is the y-axis difference between the 155 mm curve and the point 301. Difference 302 is the y-axis difference between the 8-inch curve and the point 301.

Errors in estimating the drag coefficient, errors in estimating projectile velocity, and errors in meteorological data measurement do not have a significant impact on the use of Pearce's universal curve approach in the radar tracking filter, i.e. in generating projectile kinematics. But the impact of these errors make its use in extracting LMH-Class difficult, since typically an unacceptably high probability of false ID results. In fact, these errors impact any conventional approach that derives LMH-Class from drag estimates. Such approaches also suffer from the requirement of an extensive database, since every projectile encountered must have a drag parameter curve associated with it.

SUMMARY OF THE INVENTION

It is therefore an object of the present invention to identify and classify the relative weight of projectiles being tracked by radar as light, medium or heavy.

Another object of the present invention is to solve the LMH-Class problem in a way that avoids the need for a LMH-class database including drag parameters associated with each projectile.

Yet another object of the present invention is to provide a method of classifying light, medium and heavy projectiles in a manner that greatly reduces sensitivity to radar measurement and meteorological data errors compared to conventional drag parameter association approaches.

Still another object of the present invention is to eliminate the need for an extensive database in doing a relative weight determination.

Another object of the present invention is to decouple the process of determining relative weight from other tracking and estimation functions of the radar.

Still another object of the present invention is to generate a classification parameter in a form that is insensitive to inaccuracies in temperature, air pressure, wind and other meteorological measurements affecting the drag function.

Yet another object of the present invention is to provide a measure of the relative weight of a projectile tracked with a radar by converting real time measurements of the projectile's drag function, which exhibit a nonlinear relationship with respect to Mach number to measurements exhibiting an essentially constant relation or ramp with respect to most Mach number values, by transforming a nonlinear estimation problem difficult to perform to the simplest types of linear estimation problem. The curves are essentially flat or straight except for a region where the projectile passes through Mach 1.

The invention advantageously employs a different normalization than that used by Pearce; namely, by performing a functional normalization by reference drag curve rather than function normalization by a single point selected on each individual curve.

These and other objects of the present invention are achieved by a method including measuring a projectile velocity and an acceleration from radar track data. The air temperature and an air pressure are measured. The measured air temperature and the measured air pressure are extrapolated to the projectile's location for each instant in time a radar measurement made by the radar. The projectile's drag parameter is estimated at each time in the projectile's flight that the projectile's velocity and acceleration are estimated. The projectile's Mach number is estimated at each time in the projectile's flight. The drag coefficient is estimated. A functionally normalized drag parameter (FNDP) is formed. The FNDP is defined as the ratio of drag parameter of a reference projectile at each Mach number the drag is measured to the in-flight projectile's drag parameter at the corresponding Mach numbers. A weighted average of the resulting FNDP values is performed with respect to Mach number. The most likely of three regions the FNDP parameter lies is statistically determined. The relative weight of the in-flight projectile is inferred as one of light, medium or heavy based on the most likely of the three regions.

The foregoing and other objects of the present invention are achieved by a method including estimating the projectile's drag parameter at a plurality of points in the projectiles flight when a velocity and an acceleration are estimated. The projectile Mach number is estimated at a corresponding plurality of points when the drag coefficient is estimated. A functionally normalized drag parameter (FNDP) is formed. The FNDP is defined as the ratio of drag parameter of a reference projectile at each Mach number the drag is measured to the in-flight projectile's drag parameter at the corresponding Mach numbers. A weighted average of the resulting FNDP values is performed with respect to Mach number. The most likely of three regions the FNDP parameter lies is statistically determined. The relative weight of the in-flight projectile is inferred as one of light, medium or heavy based on the most likely of the three regions.

Still other objects of and advantages of the present invention will become readily apparent to those skilled in the art from the following detailed description, wherein the preferred embodiments of the invention are shown and described, simply by way of illustration of the bet mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 3 depicts how errors in LMH-Class arise when using track data association-to-stored drag parameter data;

BEST MODE CARRYING OUT THE INVENTION

Figure 1:
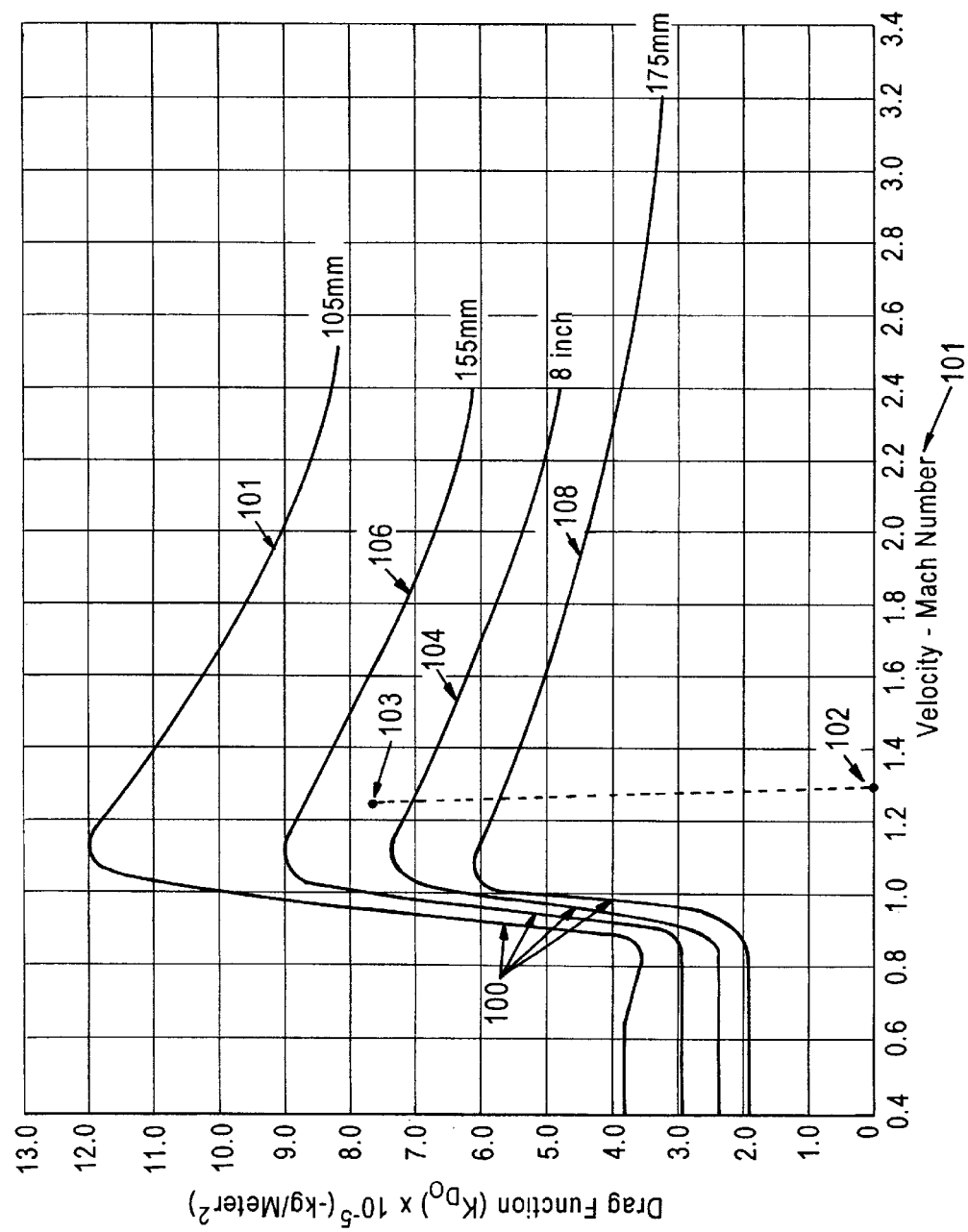
FIG. 1 is an illustration of drag parameter curves for a class of artillery projectiles, and illustrates how drag parameter estimates are used to determine projectile weight classification.
Figure 2:
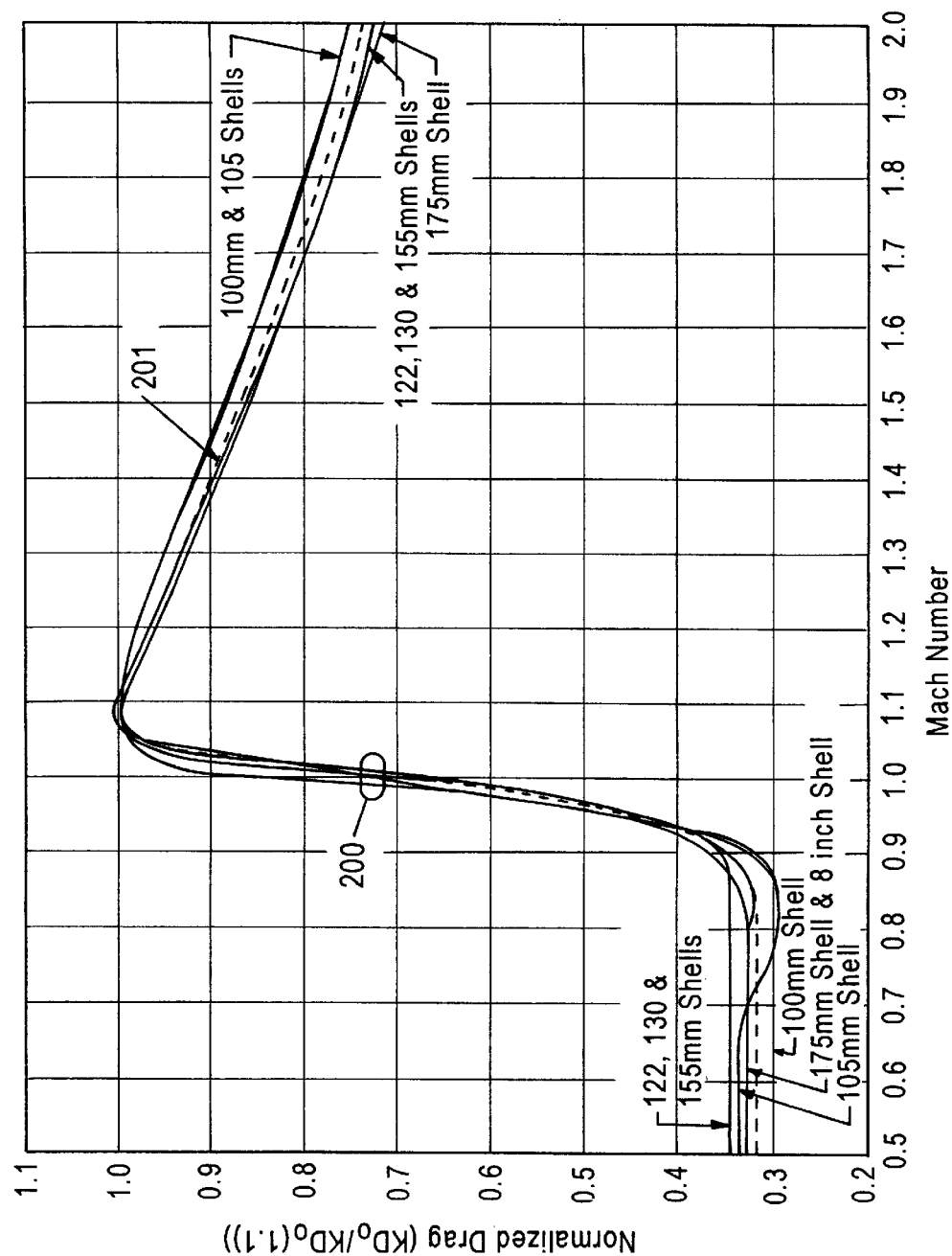
FIG. 2 illustrates the drag curves of FIG. 1 normalized according to a prior art method disclosed in Pearce.
Figure 4A:
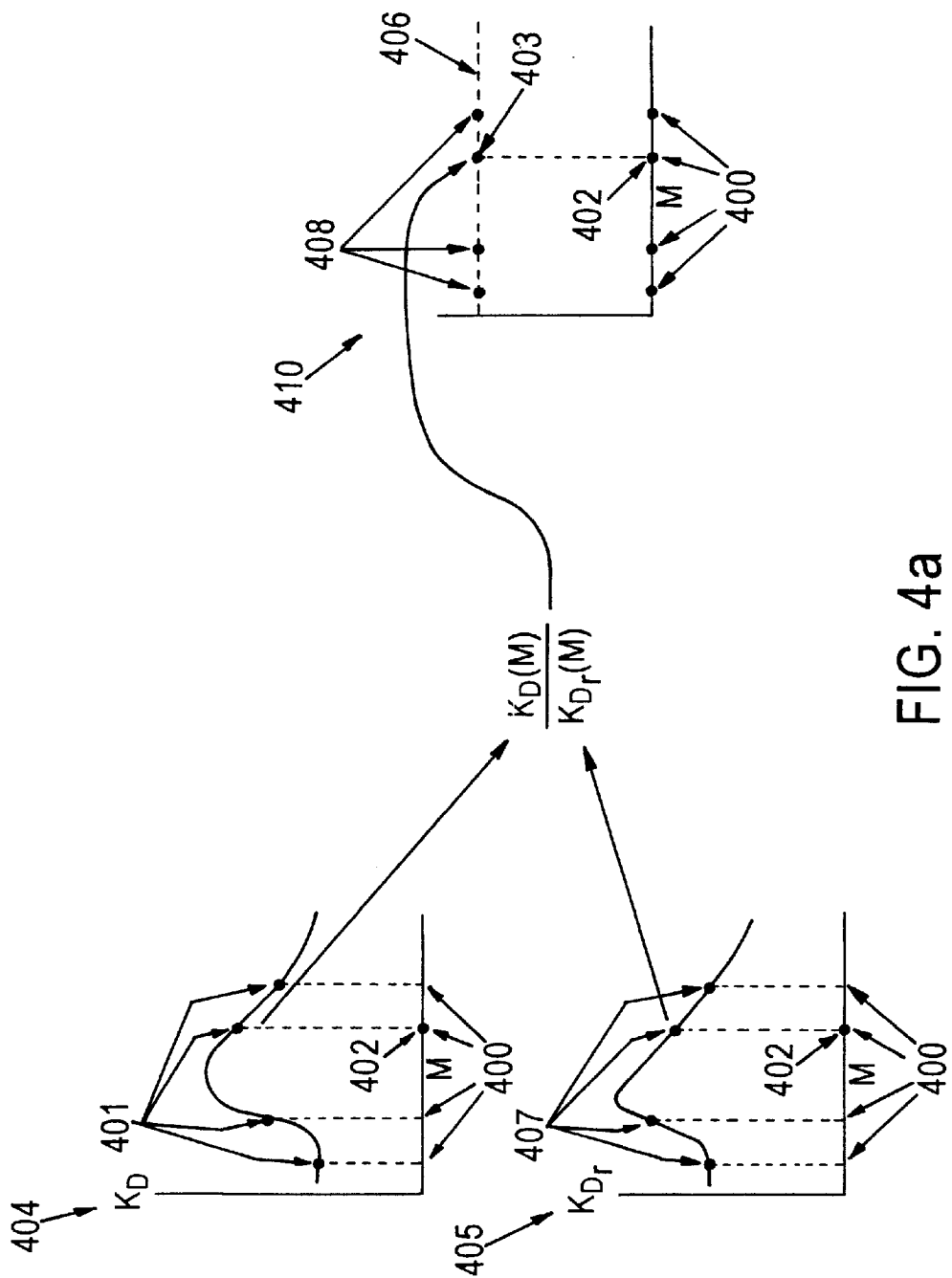
FIG. 4a illustrates the generation of the functionally normalized drag parameter (FNDP)
Figure 4B:
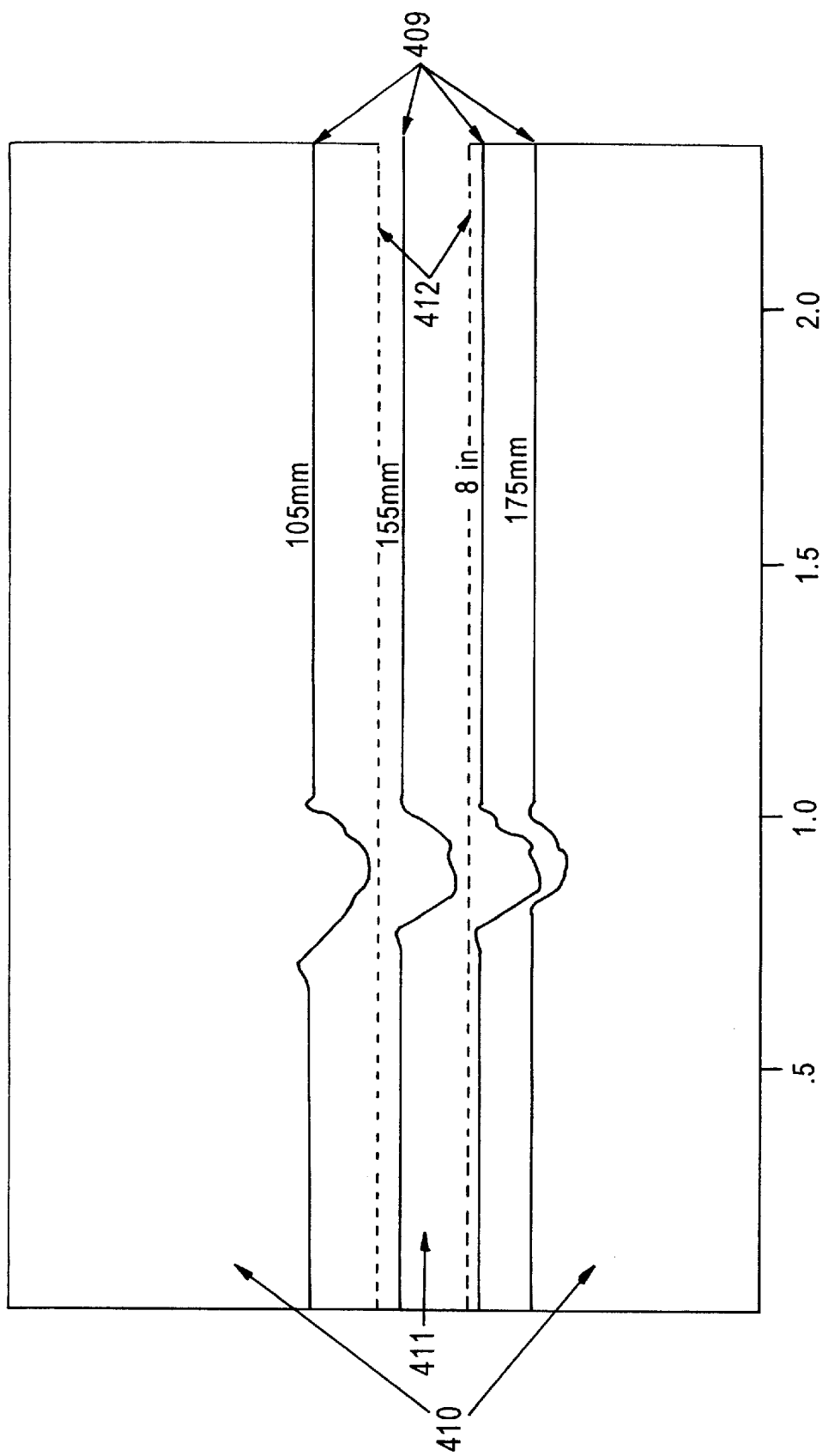
FIG. 4b depicts the result of performing the functional normalization of the curves 100 in FIG. 1 by the curve 105.

Referring first to FIG. 4, and keeping the previous description of FIGS. 1–3 in mind, the functional normalization is carried out by dividing the reference drag parameter $K_{D_r}(M)$ depicted in graph 405 (FIG. 4a) into the measured projectile drag parameter $K_D(M)$ depicted in graph 404, where the reference drag is evaluated at the same Mach numbers 400 at which the projectile drag is measured at a plurality of points 401 on the curve depicted in the graph 404. For example, at Mach number 402 (in graph 404) the measured drag is ratioed with the reference drag value to get an estimate 403 depicted in graph 410. It is an important advantage of this method that, in the absence of measurement error and model inaccuracies introduced by the approximations in the PM model (Equation 1), if each of the other values 401 is ratioed with the corresponding reference values 407 the resulting values 408 lie on the same constant straight line 406 in the graph 410 that passes through 403. FIG. 4*b* illustrates this normalization approach applied to the drag curves in FIG. 1. For instance if the 155 mm curve is selected to normalize the curves 100 in FIG. 1, LMH-Class observability changes dramatically compared with the use of the measured drag parameter alone. The curves 409, called functionally normalized drag parameters or FNDP, depicted in FIG. 4*b* are now associated with each caliber in all Mach regimes, and thus with each projectile's weight, and this association is advantageously not subject to errors in Mach number estimation.

Hence one object of the present invention is to provide a measure of the relative weight of a projectile tracked with a radar by converting real time measurements of the projectile's drag function, which exhibit a nonlinear relationship with respect to Mach number, to measurements exhibiting an essentially constant relation or ramp with respect to most Mach number values, by transforming a nonlinear estimation problem difficult to perform to the simplest types of linear estimation problem.

One aspect of the present invention is to eliminate the need for an extensive database in doing the relative weight determination. The present invention substitutes regions 410, FIG. 4, above and below the reference region 411 for specific curves 100, FIG. 1. No database encompassing all projectiles that may be encountered is required. In fact the only data needed is the reference drag curve used for normalization, and the boundaries 412 of the "medium" region shown in FIG. 4. The boundary divisions occur at the weighted midpoint between the curves 412. As depicted in FIG. 4*b*, a family of reference curves 409 includes normalizations of the values for the 105 mm, 155 mm, 8 inch and 175 mm caliber shells.

The present invention advantageously decouples the process of determining relative weight from other tracking and estimation functions of the radar.

The present invention decouples the process of determining relative weight from other tracking and estimation functions of the radar. Thus, estimation of the FNDP requires no approximations to Equation 1, e.g. Pearce's universal drag curve, and in fact may be estimated from Equation (1) using radar position, Doppler, or position and Doppler measurements. This is seen by multiplying both sides of Equation 1 by the projectile's velocity utilizing the vector dot product. The drag parameter can then be solved for, giving $$K_D = \frac{\vec{v} \cdot (\vec{g} - \vec{a})}{\rho [\vec{v} - \vec{w}][\vec{v} \cdot (\vec{v} - \vec{w})]} \quad (2)$$

The kinematical parameters appearing in Equation (2) are either measured directly by the radar, or easily derived from radar measurements. Note that these derived measurements do not have to come from the radar's tracking filter. The radar-tracking filter can be very complex, since it may be structured to solve the estimation problems of backtracking-to-launch-point and extrapolating-to-impact-point. Solving these problems may involve processes such as the use of universal drag functions, since the estimates are required at times far removed from the instant the measurements were made. But obtaining the FNDP requires a much simpler estimator producing smoothed position and velocity values only at the time the radar measurements were obtained. Such an estimator typically does not require a state model as elaborate as those employing Pearce's universal drag curve method.

The other data required in estimating the drag parameter using the right hand side of Equation (2) is available from standard meteorological measurements already required as inputs to utilize Firing Tables. Firing Tables establish the performance of the weapon for different projectile-propellant combinations. They allow the incorporation of meteorological and other data in the field to determine the deflection and quadrant elevation to use in aiming for a given shell, charge, fuse and fuse setting, with the target at a known range, altitude, and azimuth on the battlefield. But if these measurements are not available in a timely fashion there is little degradation in the LMH-Class performance, i.e. little increase in the false classification error rate if a standard atmosphere model is used. Thus, the present invention is to generate a classification parameter in a form that is insensitive to inaccuracies in temperature, air pressure, wind and other meteorological measurements affecting the drag function.

Figure 5:
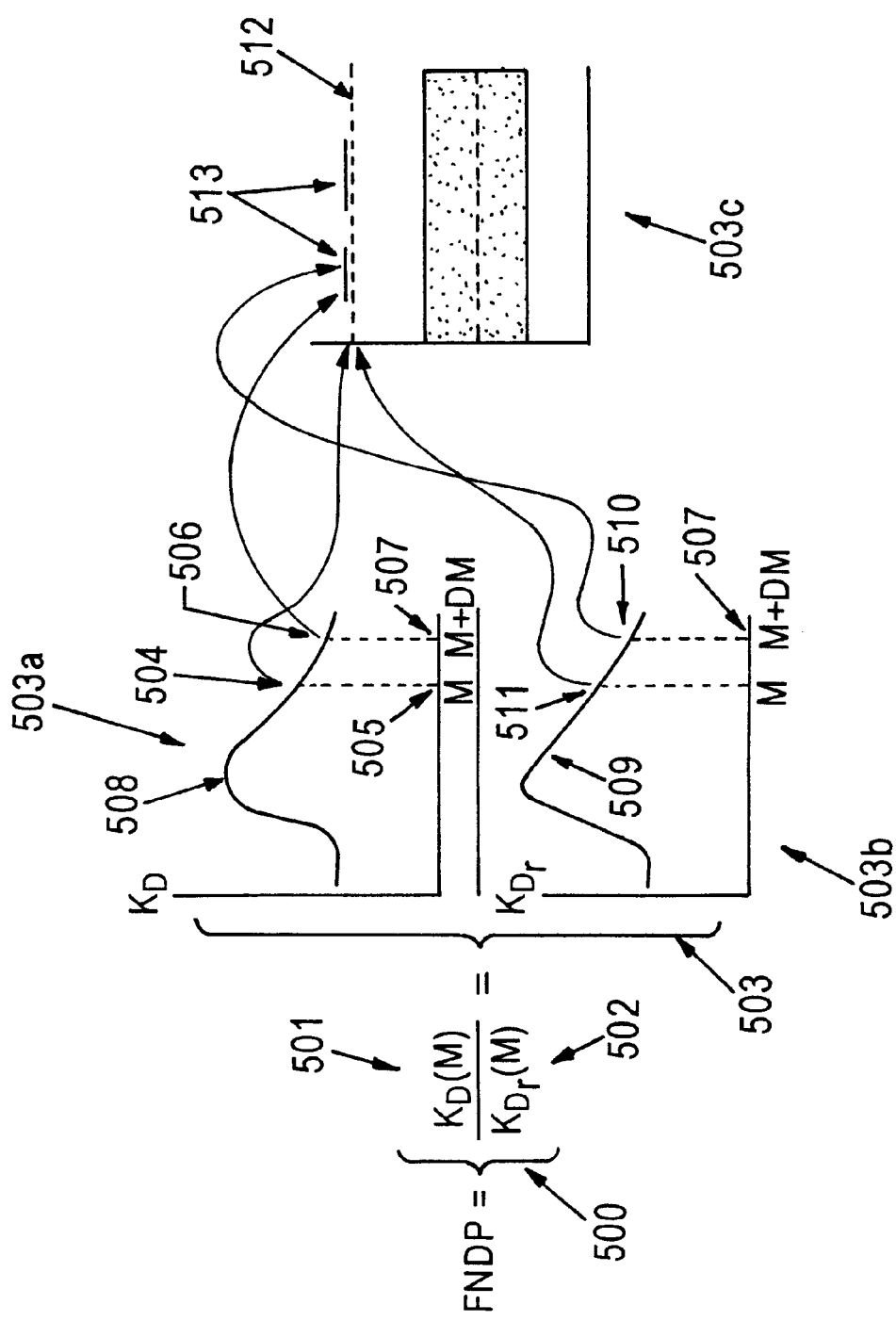
FIG. 5 depicts how normalization by the reference drag parameter reduces sensitivity to errors, and also indicates how the normalization converts what, without functional normalization, is a difficult nonlinear estimation problem for the drag parameter, into the simplest linear one for Functionally Normalized Drag Parameter (FNDP)

FIG. 5 illustrates how the present invention accomplishes the aforementioned objective. The ratio 500 represents the normalization of the drag parameter 501 estimated via Equation (2), by 502, the stored reference drag parameter at the same Mach number. This ratio, the FNDP, is depicted graphically by graphs 503 including graphs 503*a* and 503*b*. The specific measured drag parameter value 504 occurs at the true Mach number at point 505, but because of meteorological and other system measurement errors, the Mach number actually estimated is higher and represented by a point 507. Since Equation (2) preserves the functional form 508 of the drag curve, the error results in incorrect estimate 506 which lies to the right of the true value 504. When the value of the reference drag parameter 510 is accessed using this incorrect Mach number, the value 510 chosen has also decreased along the y-axis from its correct value 511, and in a manner proportional to that in the measured drag. Thus the errors, so long as they are equivalent to Mach number estimation errors, essentially cancel. Hence the resulting FNDP estimates 513 depicted in graph 503*c* are only slightly biased off from the true value 512.

Figure 6:
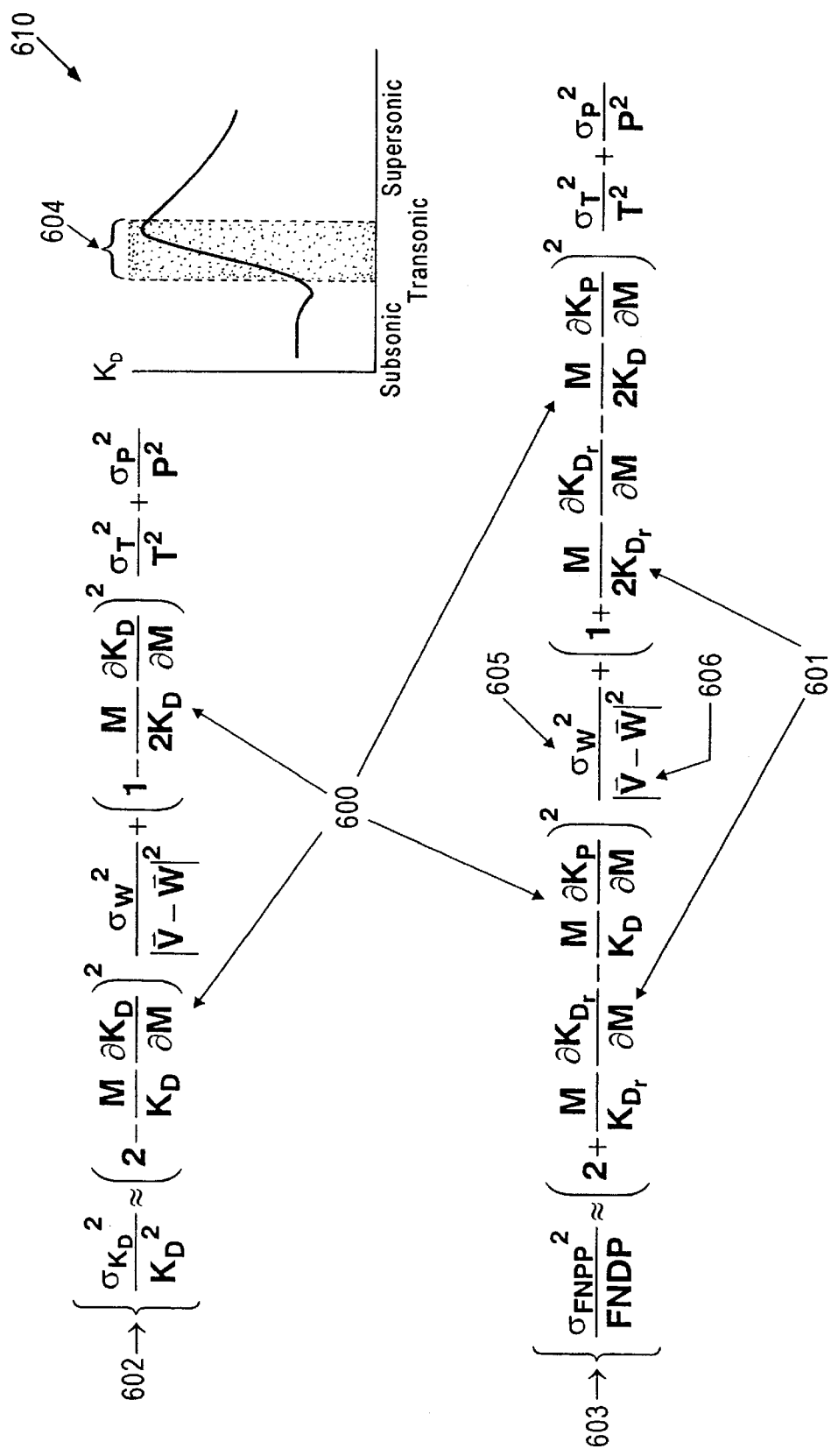
FIG. 6 provides a quantitative explanation of the FNDP's reduced sensitivity to data measurement errors compared to the drag parameter.

This important aspect of the invention is quantified as follows. In FIG. 6, Equation 602 gives the sensitivity of the drag parameter estimate to meteorological data errors in the measurement of wind w, temperature T, and atmospheric pressure p. In Equation 602 the partial derivatives 600 represent the change in the drag curve to changes in Mach number. In the transonic region 604 depicted in graph 620 these changes are particularly large, and even small errors make estimates of the drag parameter alone useless. The sensitivity of the FNDP estimate is given by Equation 603 in FIG. 6. Because the measured drag parameter is normalized by the reference drag parameter the partial derivatives 601 now appear. If the measured and reference drag parameters are members of the same set satisfying Pearce's universal drag curve criterion, i.e. the set 100 in FIG. 1 such that Pearce normalization collapses the measured and reference drag parameters to 200 in FIG. 2, then the partials 601 cancel 600 almost totally. But even when the measured and reference drag parameters are not members of the same universal curve family, cancellation is nearly complete. Thus the impact of errors in meteorological data measurements and Mach number estimation is almost eliminated in the approach of this invention. The manner in which the invention is implemented to accomplish this and the other objectives will be clearer as described in detail below.

Figure 7:
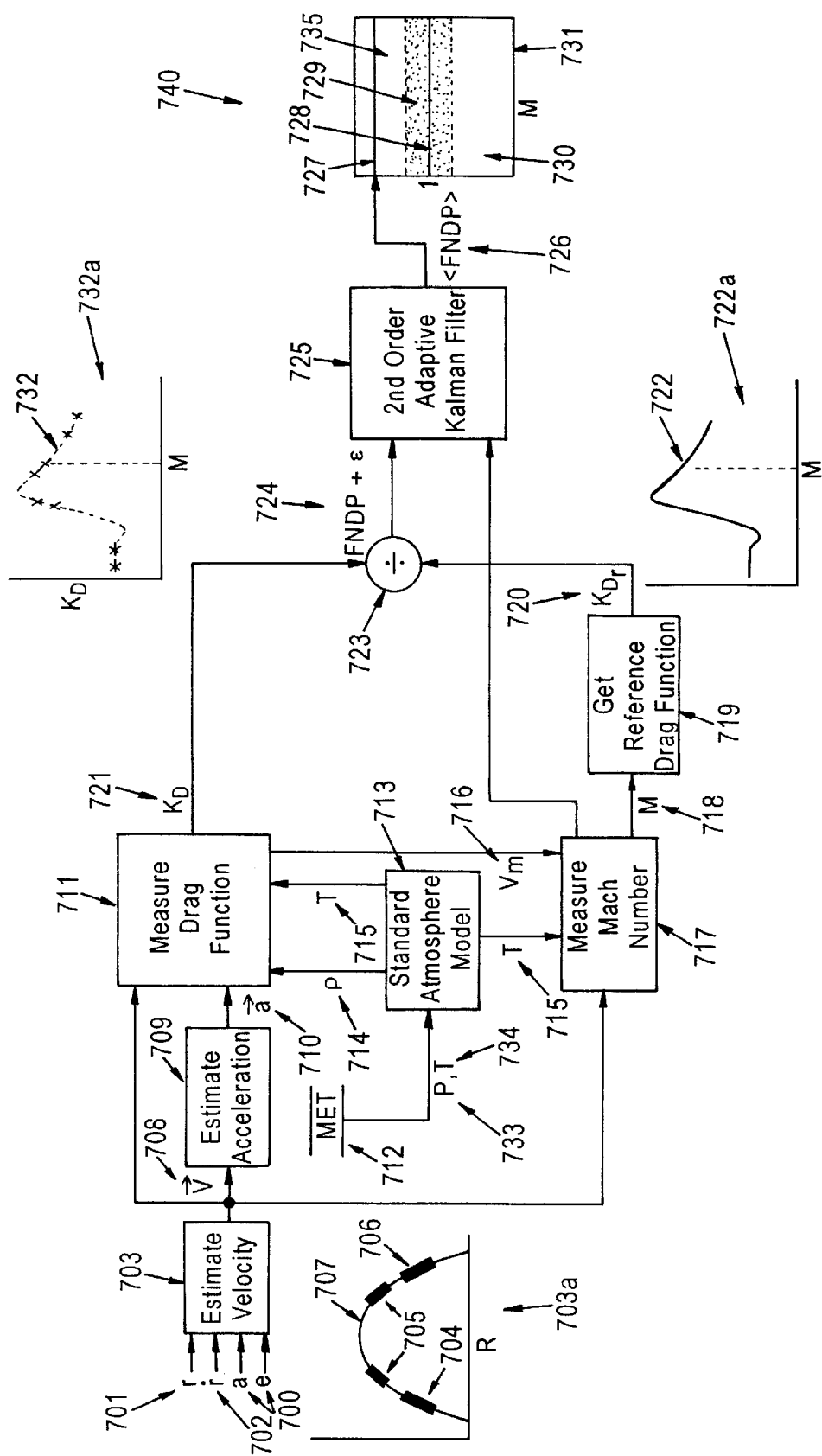
FIG. 7 is a block and flow diagram illustrating how the normalization indicated in FIG. 2 is implemented to determine both weight and projectile type.

FIG. 7 is a block and flow diagram of the method of the present invention. Radar track data is input to a velocity estimator 703. This data always consist of azimuth and elevation measurements 700, and includes either range 701, Doppler 702, or both range and Doppler measurements. This data can be measured from different portions of the trajectory 707 depicted in graph 703a. A region 704 involves supersonic velocities for all projectiles, although missiles may be subsonic in this region before boosting is complete. Regions 705 involve transonic and subsonic measurements, while in a region 706, near the impact point the velocity 708 estimated can be both transonic and supersonic. Short range artillery locating radar (ALR) measure data only in a region 706. Long range track ALR may only measure data either in region 704 or 705. Long range track while scan radar typically measure data in all the regions illustrated. The present invention works with all three types of radar, but the long-range track while scan ALR is the preferred radar to implement this method.

Following step 703, the velocity 708 is input to an acceleration estimator 709, and the acceleration estimate 710 concurrent with the velocity estimate obtained. The estimation processes 703 and 709 can be independent of the radar tracking filter when the present invention is implemented in existing systems, or it can be incorporated into the radar tracker. If separate from the tracker, polynomial signal models are used based on the range and Doppler measurement combinations available. If incorporated into the radar tracker, the preferred signal model is based on the PM model, Equation 1, utilizing Pearce's universal drag curve approach.

The filtered estimates of velocity 708 and acceleration 710 are next used to measure drag function 711 using the drag coefficient derived via Equation 2. Meteorological (MET) data 712 is required, and this must be extrapolated from the time and the place atmospheric temperature and pressure were measured to the projectile position and time concurrent with the velocity estimates 708. This extrapolation is done with an estimator 713 based on a standard atmosphere model, such as the *U.S. Standard Atmosphere Model*, 1962 prepared by the U.S. Committee on Extension to the Standard Atmosphere (COESA). Although Equation 2 includes the wind vector at the projectile position, the sensitivity equation, 603 FIG. 6, indicates that wind errors 605 are normalized by the projectile speed 606, and hence the neglect of wind has little impact on drag measurement accuracy. Therefore wind measurements are not incorporated into the set of air density 714 and temperature 715 input to the drag function estimator 711.

The extrapolated temperature 715 is used to estimate 717 the Mach number 718 by deriving the speed of sound at that temperature, and dividing this speed into the velocity estimate 716 exactly concurrent with the acceleration estimate 710. This velocity may be different from 708, depending on the signal model employed by 711.

The Mach number estimate 718 is used to access 719 the value of the reference drag 720 occurring at the same Mach number as the measured drag parameter 721. The reference drag is preferably stored as a function of Mach number, and initially obtained from a global maximum likelihood fit utilizing the parameterization described by Shanks and Walton, Naval Ordnance Command, Washington, D.C. Report NAVORD 3634. This functionalization is indicated by 722 in graph 722a, and typically represents the drag for a 155 mm projectile.

The drag measurements 721 are corrupted by errors in all the measurements input to process 711, and, because of the nonlinear dependence 732 of this function on Mach number depicted in graph 732a, are difficult to smooth to reduce the effects of these errors. But, after the normalization indicated by 723, the FNDP parameter measurement 724 is either a constant function of Mach number for projectiles with no mass loss, or, for projectiles with mass loss, changes in an essentially linear manner. This linear function is filtered by the linear estimator 725 to obtained the smoothed estimate 726. In this example it is assumed that the radar track data is for a projectile smaller then the reference 155 mm projectile, and so the estimated FNDP 727 depicted in graph falls above the reference line 728. The projectile is thus classified as "light". Projectiles falling within the shaded region 729 would be classified medium, while those in region 730 below the shaded region 729 are heavy.

Figure 8:
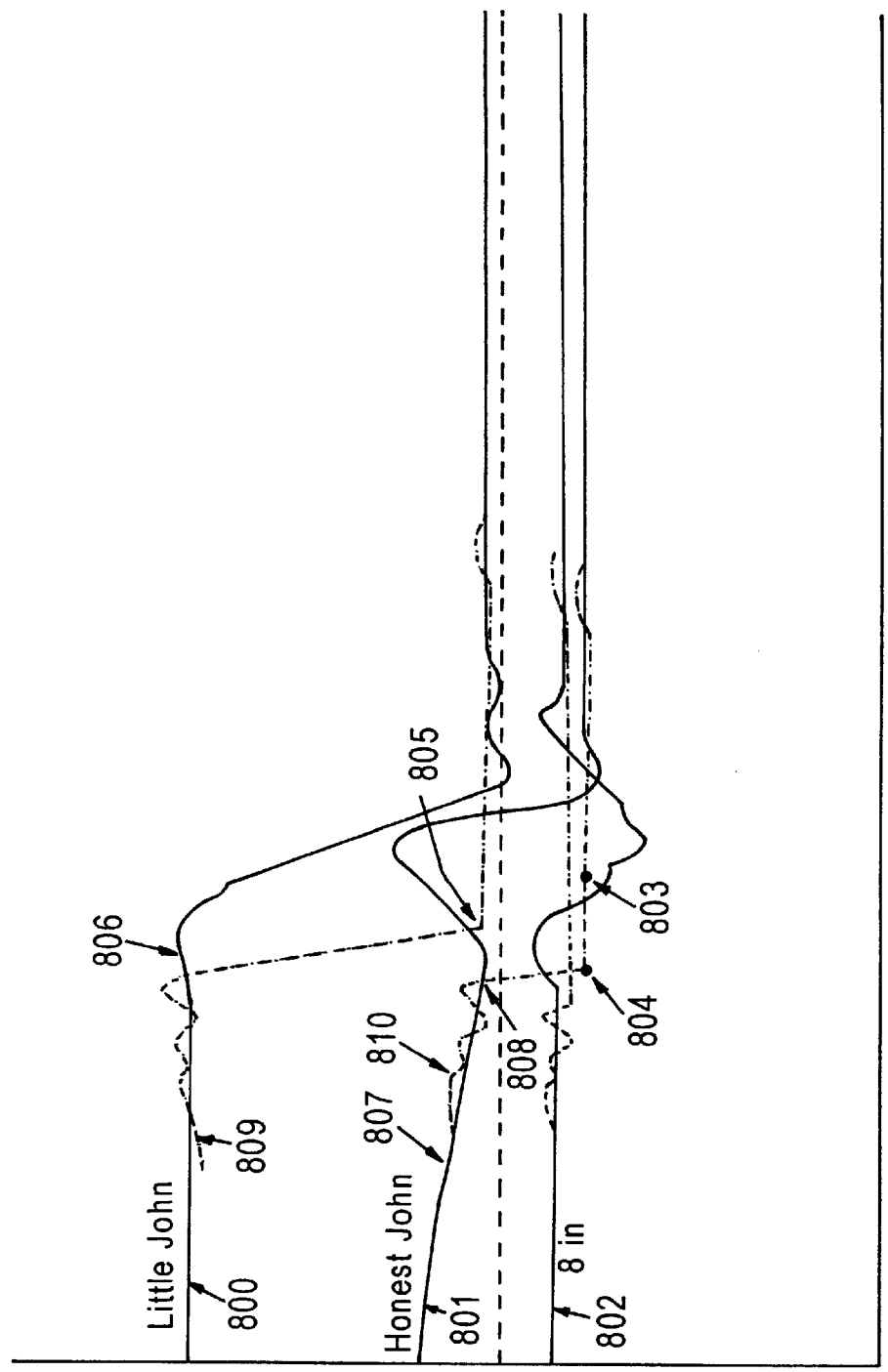
FIG. 8 illustrates the variation in the FNDP caused by projectile mass change.
Figure 9:
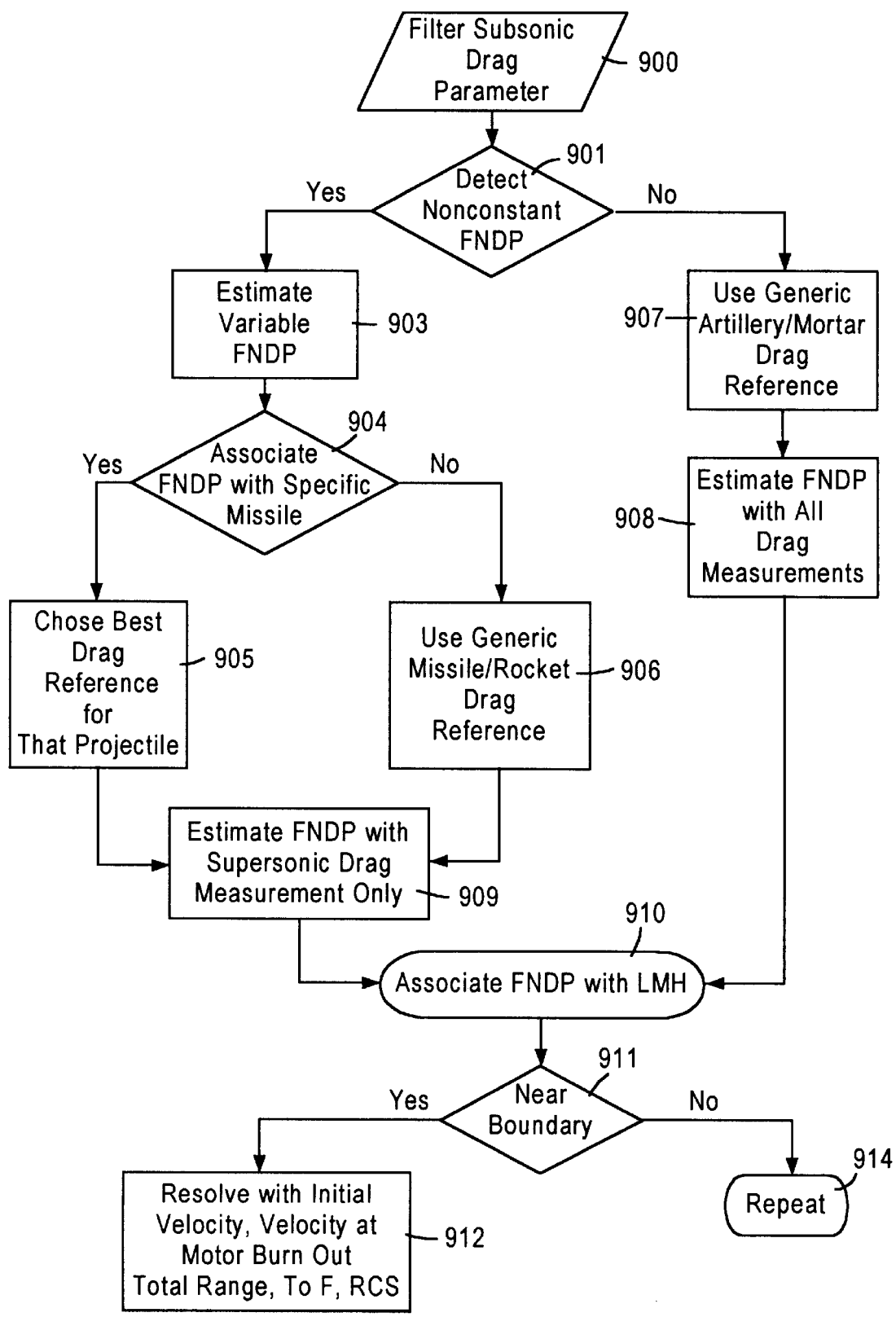
FIG. 9 illustrates the FNDP processing used to obtain projectile LMH-Class, and to further determine whether the projectile is rocket or missile.

The set of FNDP curves 731 in the graph 740 are depicted as constant functions of Mach number, i.e. for projectiles with no mass change, whereas in FIG. 8 the variation of the FNDP parameter for 800 Little John and 801 Honest John rockets is depicted. A 155 mm-howitzer shell reference drag parameter was used, and an FNDP typical of an 8 in-artillery shell included for comparison. The rocket FNDP parameters in FIG. 8 have variations in the subsonic region because of mass loss during boosting. For example, the Little John rocket may go from 780 lbs to 530 lbs in this region, while the Honest John may change from 4300 lbs to 2600 lbs. These mass changes produce variations in the FNDP that are characteristic of the particular rocket, and may be further used to classify the projectile as powered or unpowered. If the reference data base is extended from the single reference curve 722 these characteristic variations can be also used to classify the projectile as a particular rocket or missile type. FIG. 9 illustrates this processing.

In process 900 (FIG. 9) the estimator 725 filters data from the subsonic region, after first establishing an estimate of the FNDP parameter for supersonic Mach numbers. The estimator predicts the initial value used in the subsonic region from the last estimate in the supersonic region. That is, it extrapolates from Mach 1.1 to Mach 0.8, as indicated by 803 (FIG. 8) carrying across to predict estimate 804. This extrapolation is done because of the sensitivity of the FNDP to measurement errors in the transonic region, as indicated by partial derivatives 600 and 601 (FIG. 6). The decision on whether to use a measurement, or discard it and extrapolate the estimate is controlled by the noise model used in the estimator. When the filter senses the measurement noise variance has been reduced enough to begin utilizing measurements again, it may find the new FNDP values 806 quite different from the last extrapolated value 805. Also the filter may find a linear 807 trend exist in the subsonic region. Therefore, this filter is implemented as a second order adaptive Kalman filter, where the adaptive feature adjust the filter's bandwidth after detecting a mismatch between the assumed signal model and the actual measurements. The preferred realization of this adaptive feature is given by A. H. Jazwinski in *Stochastic Processes and Filtering Theory*, Academic Press, New York, 1970 which is incorporated by reference in its entirety. The assumed signal model in the supersonic region is a fixed constant, but in the subsonic region mass loss cause a linear change which the filter detects at step 901 (804–808 and 805–806) as a bias in the filter residual. The filter "opens" its bandwidth upon detecting this bias, and estimates the linear trend 807 at step 903, or adjust to the large step change 800. The estimate (809 or 810) in the subsonic region is then matched at step 904 against a stored set of parameters characteristic of known missiles and rockets. If a match is found, this is used to at step 905 to type the projectile as belonging to a specific member of the mass-variant class, e.g., as a Little John rocket. If no match is found the projectile is just typed at step 906 as mass variant. From step 901, when no change in the FNDP is detected in the subsonic region, the projectile is classified at step 907 as artillery or mortar.

If the FNDP were constant, only a first order estimator would be required. But when the projectile mass changes the FNDP changes in an approximately linear way. A second order filter is required to track this new variation. Therefore the parameters in the Kalman filter are selected so that it operates initially as basically a first order filter until an inconsistency is detected between the value of the FNDP predicted at the next measured velocity, and the actual measured value of the FNDP parameter. When this mismatch is detected the filter adjust its parameters to behave like a second order estimator. This automatic mismatch detection and adjustment of the filter order is an adaptive feature.

The LMH-Class process proceeds somewhat differently in the two cases. If no mass change is detected, data from all Mach regions is used at step 908 to do LMH-Class. If mass variation occurs, only data in the supersonic region at step 909 is used. For either case, special care must be taken with data in the transonic region. As noted above the FNDP in this region can exhibit large variations that are not due to mass change. These variations are caused by yaw-of-repose, which is neglected by Equation 2, and other mismatches between the model assumed and actual projectile behavior. To handle this effect, the measurement noise on the FNDP parameter 724 assumed by the filter is set to a very high value between Mach 1.1 and Mach 0.8. This causes the filter to de-emphasize measurements in the transonic Mach region.

From either step 908 or 909, light, medium or heavy classification at step 910 is then accomplished by simply picking the reference 731 (FIG. 7) appropriate to the mass-variant or mass-constant set the projectile belongs to, and then determining the region in which the FNDP lies. If the estimated FNDP falls in region 735 it is light, while in 729 it is medium. An estimate in 730 establishes the projectile as heavy. The Kalman filter produces an error variance for the estimate, and this error variance determines the probability the FNDP lies in a given region. This probability can be used to set a threshold for reporting the association. Projectiles close to the medium boundaries may consistently fail to meet the threshold criteria, so special care is exercised in choosing these boundaries, assuring the smallest number of projectiles are affected. These ambiguous projectiles are further processed at step 911 using initial velocity and other track data to resolve the uncertainty in FNDP classification. If the projectiles are near the medium boundary, then at step 912, this ambiguity is resolved using initial velocity, velocity at motor burnout, total range, time to burnout, quadrant elevation, projectile flight distance, time of flight and radar cross-section.

It should now be apparent that a method and apparatus has been depicted in which light, medium and heavy projectiles are classified in a manner which greatly reduces sensitivity to radar and meteorological data. Specifically, the present invention performs a functional normalization of a reference drag curve instead of a function normalization by a single point selected on each individual curve.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of identifying and classifying the relative weight of projectiles being tracked by radar as light, medium or heavy (LMH), comprising the steps of:

measuring a projectile velocity and acceleration from radar track data;

measuring an air temperature and an air pressure;

extrapolating the measured air temperature and the measured air pressure to the projectile's location for each instant in time that a radar measurement is made by the radar;

estimating the projectile's drag parameter at each time in the projectile's flight that the projectile's velocity and acceleration are estimated;

estimating the projectile's Mach number at each time in the projectile's flight that the drag coefficient is estimated;

forming a functionally normalized drag parameter (FNDP), the FNDP being defined as the ratio of drag-parameter of a reference projectile at each Mach number the drag is measured to the in-flight projectile's drag parameter at the corresponding Mach numbers;

performing a weighted average of the resulting FNDP values with respect to Mach number; and statistically determining the most likely of three regions in which the FNDP parameter lies, and inferring the relative weight of the in-flight projectile as one of light, medium or heavy based on the most likely of the three regions.

2. The method of claim 1, wherein the reference drag curve is chosen to minimize the sensitivity of the FNDP to errors in both meteorological data and radar-derived velocity estimates that cause the measured projectile Mach number to differ from the true Mach number.

3. The method of claim 1, wherein the U.S. Standard Atmosphere, 1962, model is used to extrapolate temperature and pressure meteorological measurements from the time the measurements were made to the time the projectile's velocity is measured, and to extrapolate the meteorological measurements in space to the position of the projectile concurrent with the estimated velocity.

4. The method of claim 1, wherein the velocity is measured by Doppler radar, and the acceleration derived from the velocity measurements using a first order polynomial estimator.

5. The method of claim 1, wherein range only is measured by the radar, and velocity and acceleration measurements are derived from these range measurements using a third order polynomial estimator.

6. The method of claim 1, wherein both range and Doppler are measured by the radar, and velocity and acceleration are estimated using a mass point model as the signal model in an optimal estimator, this signal model incorporating a universal drag function curve depending on a single parameter, where that parameter is estimated simultaneously with the projectile's velocity and acceleration.

7. The method of claim 1, wherein the projectile's drag coefficient is measured using the relationship derived from the mass point model as follows:

$$K_D = \frac{\vec{v} \cdot (\vec{g} - \vec{a})}{\rho |\vec{v} - \vec{w}| [\vec{v} \cdot (\vec{v} - \vec{w})]}$$

8. The method of claim 1, comprising classifying the projectile as belonging to one of two types, artillery, including mortars, or missiles, including rockets and rocket assisted projectiles (RAPs), and then determining the LMH-Class using statistically significant deviations of the NFDP parameter from a constant value at all Mach numbers comprising the steps of:
  detecting the deviations of the FNDP from a constant value;
  estimating the magnitude of the deviation from the measured constant value;
  associating the estimated magnitude with stored values;
  determining from this association the most likely projectile type;
  finding the reference drag parameter appropriate to this type;
  statistically determining from the most reference drag parameter in which the measured drag parameter lies likely of three regions determined by inferring the LMH-Class from the association.

9. The method of claim 1, comprising filtering the FNDP measurements by a second order adaptive Kalman filter, wherein an adaptive feature of the filter adjusts for the effect of projectile mass change on the FNDP, and comprising:
  predicting a constant FNDP at all Mach numbers;
  comparing the predicted FNDP with the measured FNDP;
  detecting statistically significant deviations of the predicted FNDP from the measured FNDP; and
  adjusting a Kalman filter signal model when deviations are detected to predict a linear change in FNDP with respect to Mach number.

10. The method of claim 9, wherein detection of variable FNDP causes a different light, medium, or heavy association to be made with the FNDP distance from unity, comprising of:
  measuring this distance only in the supersonic region; and
  associating the measured distance with a special associative set for rockets and missiles, where the association utilizes the error variance from the Kalman filter to obtain the maximum likelihood estimate of the most likely association from this set.

11. The method of claim 1, wherein FNDP near either an upper or a lower medium boundary in a statistical sense form an ambiguous class of projectiles, where the LMH-ambiguity is resolved by further processing involving associating measured data with stored reference data for both constant-mass and mass-variant projectiles in this ambiguous region, the measured and stored data including any subset of the following set: initial projectile velocity, velocity at motor burn-out, time to burn-out, quadrant elevation, projectile flight distance, time-of-flight, and radar cross-section.

12. The method of claim 8, comprising filtering the FNDP measurements by a second order adaptive Kalman filter, wherein an adaptive feature of the filter adjusts for the effect of projectile mass change on the FNDP, and comprising:
  predicting a constant FNDP at all Mach numbers;
  comparing the predicted FNDP with the measured FNDP;
  detecting statistically significant deviations of the predicted FNDP from the measured FNDP; and
  adjusting a Kalman filter signal model when deviations are detected in order to predict a linear change in FNDP with respect to Mach number.

13. A method of identifying and classifying the relative weight of projectiles by tracked radar as light, medium or heavy, comprising:
  estimating the projectile's drag parameter at a plurality of points in the projectiles flight when a velocity and an acceleration are estimated;
  estimating the projectile Mach number at a corresponding plurality of points when the drag coefficient is estimated;
  forming a functionally normalized drag parameter (FNDP), the FNDP being defined as the ratio of drag parameter of a reference projectile at each Mach number the drag is measured to the in-flight projectile's drag parameter at the corresponding Mach numbers;
  performing a weighted average of the resulting FNDP values with respect to Mach number; and
  statistically determining the most likely of three regions the FNDP parameter lies and inferring the relative weight of the in-flight projectile as one of light, medium or heavy based on the most likely of the three regions.

14. The method of claim 13, comprising:
  measuring a projectile velocity and acceleration from radar track data;
  measuring an air temperature and an air pressure; and
  extrapolating the measured air temperature and the measured air pressure to the projectile's location for each instant in time a radar measurement made by the radar.

15. The method of claim 13, wherein the reference drag curve is chosen to minimize, over all of a set of predetermined projectiles, the sensitivity of the FNDP to errors in both meteorological data and radar-derived velocity estimates that cause the measured projectile Mach number to differ from the true Mach number.

16. The method of claim 13, wherein the U.S. Standard Atmosphere, 1962, model is used to extrapolate temperature and pressure meteorological measurements from the time the measurements were made to the time the projectile's velocity is measured, and to extrapolate the meteorological measurements in space to the position of the projectile concurrent with the estimated velocity.

17. The method of claim 13, wherein the velocity is measured by Doppler radar, and the acceleration is derived from the velocity measurements using a first order polynomial estimator.

18. The method of claim 13, wherein range only is measured by the radar, and velocity and acceleration measurements are derived from these measurements using a third order polynomial estimator.

19. The method of claim 13, wherein both range and Doppler are measured by the radar, and velocity and acceleration are estimated using a mass point model as the signal model in an optimal estimator, this signal model incorporating a universal drag function curve depending on a single parameter, where that parameter is estimated simultaneously with the projectile's velocity and acceleration.

20. The method of claim 13, wherein the projectile's drag coefficient is measured using the relationship derived from the mass point model as follows:

$$K_D = \frac{\vec{v} \cdot (\vec{g} - \vec{a})}{\rho |\vec{v} - \vec{w}| [\vec{v} \cdot (\vec{v} - \vec{w})]}.$$

21. The method of claim 13, comprising classifying the projectile as belonging to one of two types, artillery, including mortars, or missiles, including rockets and rocket assisted projectiles (RAPs), and then determining the LMH-Class using statistically significant deviations of the FNDP parameter from a constant value at all Mach numbers comprising the steps of:
   detecting the deviations of the FNDP from a constant value;
   estimating the magnitude of the deviation from the measured constant value;
   associating the estimated magnitude with stored values;
   determining from this association the most likely projectile type;
   finding the reference drag parameter appropriate to this type;
   statistically determining from the most reference drag parameter in which the measured drag parameter lies likely of three regions determined by inferring the LMH-Class from the association.

22. The method of claim 13, comprising filtering the FNDP measurements by a second order adaptive Kalman filter, wherein an adaptive feature of the filter adjusts for the effect of projectile mass change on the FNDP, and comprising:
   predicting a constant FNDP at all Mach numbers;
   comparing the predicted FNDP with the measured FNDP;
   detecting statistically significant deviations of the predicted FNDP from the measured FNDP; and
   adjusting a Kalman filter signal model when deviations are detected in order to predict a linear change in FNDP with respect to Mach number.

23. The method of claim 22, wherein election of variable FNDP causes a different light, medium, or heavy association to be made with the FNDP distance from unity, comprising:
   measuring this distance only in the supersonic region;
   associating the measured distance with a special associative set for rockets and missiles, where the association utilizes the error variance from the Kalman filter to obtain the maximum likelihood estimate of the most likely association from this set.

24. The method of claim 13, wherein FNDP near either an upper or a lower medium boundary in a statistical sense form an ambiguous class of projectiles, where the LMH-ambiguity is resolved by further processing involving associating measured data with stored reference data for both constant-mass and mass-variant projectiles in this ambiguous region, the measured and stored data including any subset of the following set: initial projectile velocity, velocity at motor burn-out, time to burn-out, quadrant elevation, projectile flight distance, time-of-flight, and radar cross-section.

25. The method of claim 21, comprising filtering the FNDP measurements by a second order adaptive Kalman filter, wherein an adaptive feature of the filter adjusts for the effect of projectile mass change in the FNDP, and comprising:
   predicting a constant FNDP at all Mach numbers;
   comparing the predicted FNDP with the measured FNDP;
   detecting statistically significant deviations of the predicted FNDP from the measured FNDP; and
   adjusting a Kalman filter signal model when deviations are detected to predict a linear change in FNDP with respect to Mach number.

* * * * *